Patented May 26, 1931

1,806,888

UNITED STATES PATENT OFFICE

GUY H. BUCHANAN, OF WESTFIELD, NEW JERSEY, ASSIGNOR TO AMERICAN CYANAMID COMPANY, OF NEW YORK, N. Y., A CORPORATION OF MAINE

METHOD OF SEPARATING ADHERING PARTICLES

No Drawing.   Application filed February 8, 1929. Serial No. 338,634.

This invention relates to a method for recovering carbon particles from a mixture of the same with other substances.

It has its particular application to the treatment of the sludge or slurry which is obtained as a by-product during the production of ammonia from calcium cyanamide. In the process of manufacture of ammonia from calcium cyanamide, the latter is treated with water at high temperatures whereby ammonia is liberated and a solid residue is obtained. This residue consists principally of calcium carbonate and contains from 9% to 10% of carbon, which is graphitic in character. In addition, there are also present several minor ingredients such as calcium hydroxide and caustic soda.

The graphite carbon contained in this slurry has been found to have many desirable properties which make it valuable for the manufacture of dry cells, pencils and the like. Its recovery from the sludge has, therefore, been the object of a considerable amount of experimentation.

One of the methods which has been suggested for the recovery of this carbon from the sludge is the method of concentration known as froth flotation. This method is in general use for the recovery of graphite ores and gives good results when natural ores are to be treated. According to this procedure the graphitic ore is ground in rod or ball mills to a suitable degree of fineness and is then subjected to a froth flotation operation in any of the flotation cells which have been developed for the flotation concentration or ores.

When this simple procedure is attempted on the sludge above mentioned, it fails to give satisfactory results. The reason for this appears to be that the particles of carbon are coated over by the calcium carbonate and the ordinary flotation operation yields a low grade concentrate, a very poor recovery, or both. Since the sludge already consists of very finely divided particles, it would not appear likely that further grinding would be of much assistance. I have made a study of the different methods of grinding, and have found that grinding slightly improves results, but, although all sorts of combinations of grinding and flotation have been tried, I have not been able to obtain in this way a concentrate containing much more than 50% of carbon.

The reason for the failure of grinding to separate the particles must be either that the aggregates are already exceedingly small or else that the calcium carbonate reattaches itself to the carbon. With this last possibility in mind, I have tried the effect of many chemical reagents added during and after the grinding, but have not succeeded in finding any which would accomplish the desired objects of good recovery and high grade concentrates.

As a result of my experiments it was concluded that, although the ordinary methods of grinding and flotation will produce a low grade concentrate, for example one containing in the neighborhood of 50% carbon, it is not satisfactory for the production of the high grade graphite demanded by the trade.

The present invention, therefore, is particularly concerned with a method for the separation of the carbon particles from the undesired calcium carbonate by a chemical separation, followed by flotation. In practicing this invention the carbon-calcium carbonate mixture is treated with a chemical adapted to convert the calcium carbonate either into a soluble form or else into an insoluble form having less tendency to adhere to the graphite than the original calcium carbonate. For example, if the graphite-calcium carbonate mixture is treated with hydrochloric acid, the calcium carbonate is converted into a soluble salt and the graphite may then be readily recovered from the solution and from the other insoluble compounds in the mixture by flotation. While this method is perfectly satisfactory, it is expensive, owing to the cost of the hydrochloric acid.

Equally good results may be obtained, however, if sulfuric acid is used. In this case the calcium carbonate is converted to calcium sulfate, and when this mixture of carbon and calcium sulfate is subjected to the flotation operation it is now found that recovery of the graphite in a pure form is a very simple matter. I am unable to explain the difference in adhesion between the calcium carbonate and the graphite and the calcium sulfate and graphite, but my experiments have shown conclusively that the difference exists.

For example, a mixture containing 47.9% carbon was treated with sufficient sulfuric acid to give a slightly acid reaction. When the resulting slurry of carbon and calcium sulfate was subjected to a flotation operation, employing small amounts of pine oil and kerosene as flotation reagents, a froth was obtained analyzing 90.7% carbon which contained 93.8% of the original carbon in the sludge. Further runs on sludges containing 60.7% and 46.6% carbon gave concentrates analyzing 93.2% and 89.2% carbon respectively. A series of three runs on a concentrate analyzing 55.7% carbon was made in which the slurries were treated with a small excess of sulfuric acid and were then subjected to flotation at various pulp dilutions. The results of these experiments are shown in the following table:

| Sample No. | Dilution | Per cent carbon in concentrate | Per cent carbon recovered |
|---|---|---|---|
| 1 | 17.1 | 73.92 | 99.7 |
| 2 | 35.1 | 87.74 | 99.6 |
| 3 | 69.1 | 88.58 | 99.3 |

It will be seen that by increasing the dilution the grade of the concentrates is increased. In all cases an almost quantitative recovery of the carbon was effected.

From the above it will be seen that I have provided a comparatively simple yet efficient procedure for the recovery of what has heretofore been a waste product. While the invention has been described with particular reference to the recovery of graphite, it is undoubtedly true that the process is adaptable to other combinations where adherence must be overcome to recover a product, and where a chemical separation is used to effect this result.

While the invention has been described as involving the removal of the carbon by floating it away from the undesirable material, yet it is to be understood that a process which floats the undesirable material away from the carbon is also within the broad concept of the invention.

What I claim is:

1. A process of recovering elemental carbon from a slurry containing it and other particles adherent thereto, which includes the steps of dissolving the other particles, reprecipitating this material and then separating the carbon by a flotation operation.

2. A process of recovering elemental carbon from a slurry containing it and other particles adhering thereto substantially insoluble in the slurry menstruum, which includes the steps of dissolving the insoluble particles, reconverting them into insoluble form, and then separating the carbon by a flotation operation.

3. A process of recovering elemental carbon from a slurry containing it and an adhering carbonate which includes the steps of dissolving the carbonate away from the carbon, reprecipitating the dissolved material, and then separating the carbon by a flotation operation.

4. A process of recovering elemental carbon from a slurry containing it and an adhering carbonate, which includes the steps of converting the carbonate into a substantially insoluble sulfate, and separating the carbon by a flotation operation.

5. A method of recovering elemental carbon from a slurry containing it and an adhering carbonate which includes the steps of adding to the slurry sulfuric acid, and separating the carbon by a flotation operation.

6. A method of recovering elemental carbon from a slurry containing carbon and an adhering carbonate, which includes the steps of adding to the slurry a quantity of sulfuric acid in excess of that required to convert the carbonate to sulfate, and separating the carbon by a flotation operation.

7. A method of recovering elemental carbon from a slurry containing carbon and an adhering carbonate which includes the steps of adding sulfuric acid thereto until the slurry is acid, and then separating the carbon by a flotation operation.

8. A method of recovering elemental carbon from a slurry containing it and adhering calcium carbonate, which includes the steps of adding sulfuric acid thereto in a quantity in excess of that required to convert the carbonate to sulfate, and then separating the carbon by a flotation operation.

In testimony whereof, I have hereunto subscribed my name this fifth day of February, 1929.

GUY H. BUCHANAN.